United States Patent
Buisson et al.

(10) Patent No.: US 7,686,585 B2
(45) Date of Patent: Mar. 30, 2010

(54) LOCKING OF THE BLADES IN A FAN ROTOR

(75) Inventors: Herve Marc Philippe Buisson, Savigny le Temple (FR); Jean-Luc Christian Yvon Goga, Champagne sur Seine (FR); Eric Jacques Lefebvre, Champigny (FR)

(73) Assignee: SNECMA, Paris (FR)

( * ) Notice: Subject to any disclaimer, the term of this patent is extended or adjusted under 35 U.S.C. 154(b) by 696 days.

(21) Appl. No.: 11/494,582

(22) Filed: Jul. 28, 2006

(65) Prior Publication Data
US 2009/0226321 A1    Sep. 10, 2009

(30) Foreign Application Priority Data
Jul. 29, 2005    (FR) .................................. 05 08121

(51) Int. Cl.
*F01D 5/32* (2006.01)
(52) U.S. Cl. .............................. 416/220 R; 416/193 A; 416/221; 416/244 A
(58) Field of Classification Search ............ 416/193 A, 416/219 R, 220 R, 221, 244 A, 248
See application file for complete search history.

(56) References Cited

U.S. PATENT DOCUMENTS

| 4,033,705 | A | | 7/1977 | Luebering | |
|---|---|---|---|---|---|
| 4,265,595 | A | * | 5/1981 | Bucy et al. | 416/220 R |
| 4,405,285 | A | * | 9/1983 | Surdi | 416/220 R |
| 4,478,554 | A | * | 10/1984 | Surdi | 416/221 |
| 5,123,813 | A | * | 6/1992 | Przytulski et al. | 416/221 |
| 5,259,728 | A | * | 11/1993 | Szpunar et al. | 416/2 |
| 5,350,279 | A | | 9/1994 | Prentice et al. | |
| 6,457,942 | B1 | * | 10/2002 | Forrester | 416/220 R |

FOREIGN PATENT DOCUMENTS
FR    1332988    7/1963

* cited by examiner

*Primary Examiner*—Igor Kershteyn
(74) *Attorney, Agent, or Firm*—Oblon, Spivak, McClelland, Maier & Neustadt, L.L.P.

(57) ABSTRACT

A fan rotor is provided. Each blade of the fan rotor is held by a bolt. Each blade includes a blade root engaged in a groove of the rim and held by a bolt. The bolt includes a concave plate with its curve directed upstream.

12 Claims, 2 Drawing Sheets

LOCKING OF THE BLADES IN A FAN ROTOR

FIELD OF THE INVENTION

The invention relates to a fan rotor of an aircraft turbojet and more particularly relates to the locking of the blade roots in their respective grooves. It also relates to a turbojet fan equipped with such a rotor and to an aircraft turbojet, the fan of which is equipped with such a rotor.

BACKGROUND OF THE INVENTION

In a turbojet with double flow the rotor of the fan carries a certain number of blades, each blade comprising a ribbed blade root engaged in a groove arranged on the periphery of a rim. The grooves are defined between radial projections provided with lateral bosses, covering the edges of the grooves and shaped to hold the blade roots.

During production each blade root is fitted into its groove by being made to slide through the upstream end of the latter. The upstream ends are then closed, in particular by an annular flange usually called "rear cap shroud head". This flange is fixed on said rim of the rotor. It also enables longitudinal wedges, inserted in the grooves, to be locked under the blade roots.

In the following text the terms upstream and downstream are used respectively to indicate a position to the front or to the rear of the engine.

It is also known to close each groove at its upstream end by a bolt engaged in lateral notches machined on both sides of the groove, in said radial projections, in the vicinity of the upstream end of the groove. These notches open out in the groove and are directed so as to converge towards one another radially outwards.

The role of the bolts is important since the thrust load which the blade root exerts on each of them lies between 500 and 900 kg. Moreover, in the event of damage such as ingestion or loss of blade, the bolt allows the shock energy to be dissipated and the deterioration of adjacent parts to be minimized.

BRIEF SUMMARY OF THE INVENTION

Until now, bolts of the above described kind were flat parts. One of the disadvantages of this system is that the bolt must be relatively thick in order to withstand the forces and shocks mentioned above. The structure of the rotor becomes weighted down. Moreover, the notches in which these bolts are engaged have a shape which results from that of the bolt. With a bolt of the type indicated above, heavy concentrations of stress (originating from plastic deformation of the hub) are observed in certain zones close to the notches, upstream.

The invention enables all these problems to be solved.

More particularly, the invention relates to a turbojet fan rotor, comprising a plurality of fan blades attached to a rim, each blade comprising a blade root engaged in a groove of said rim and held in the latter by a bolt engaged in notches machined on both sides of the corresponding groove, in the vicinity of the upstream end of the latter, so as to prevent displacement of said blade root in the axial direction, wherein said bolt comprises a concave plate with its curve directed upstream and wherein said notches are inclined upstream and shaped to accommodate the edges of said curved plate.

Thus, the curved shape, in the manner of a baffle, allows the bolt to better withstand any force in the axial direction exerted by the blade root, which enables the thickness of the bolt and also the axial distance, which separates the upstream edge of the hub from the notches to be reduced, all other things being equal.

Moreover, advantageously, each curved plate edge has a round shape and the corresponding notches have the same profile.

Due to this particular shape, the surfaces of the zones of the curved plate edges being supported against the walls of the notches are very substantially increased, which eliminates the concentrations of stress and the harmful effects of plastic deformation, which could result therefrom.

The object of the invention is also an aircraft turbojet fan, wherein it comprises a rotor of the type defined above.

The object of the invention is also a turbojet, wherein it is equipped with a fan, the rotor of which is of the type defined above.

BRIEF DESCRIPTION OF THE DRAWINGS

The invention will be understood better and other advantages of the latter will appear more evident in the light of the following description of a turbojet fan rotor according to its principle, which is only provided as an example and should be read in conjunction with the appended drawings wherein.

DETAILED DESCRIPTION OF THE INVENTION

Figure 1:
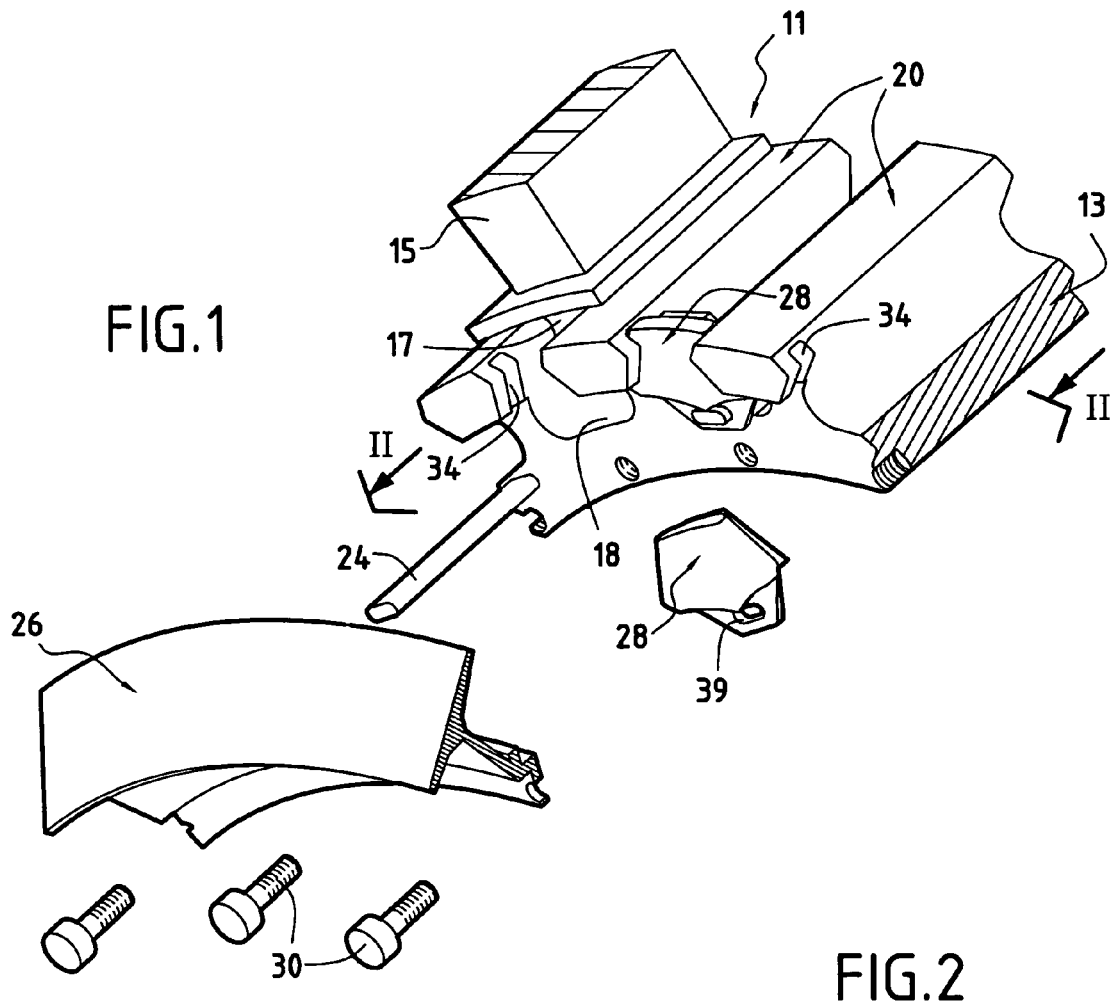
FIG. 1 is a partial exploded, perspective view of the fan rotor according to the invention.
Figure 2:
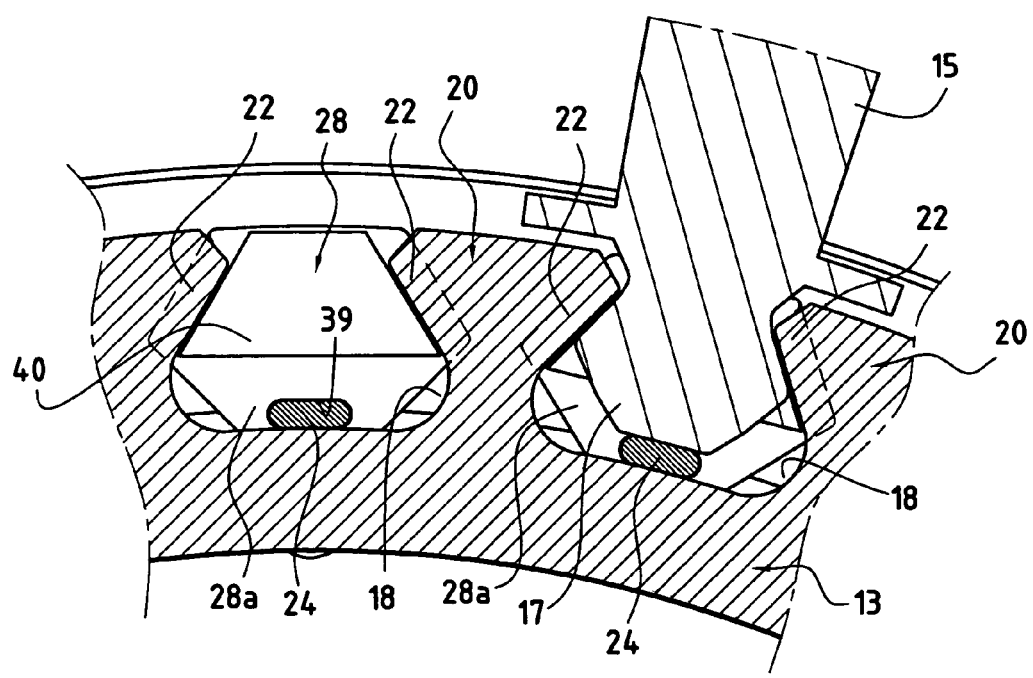
FIG. 2 is a partial section II-II of FIG. 1.
Figure 3:
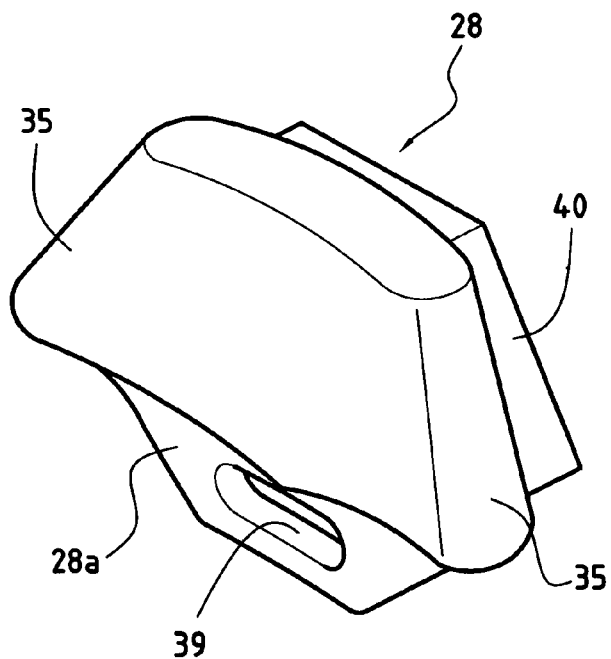
FIG. 3 is a perspective view of the bolt, on a large scale.

The fan rotor 11, as illustrated, is mainly composed of a disc forming a kind of rim 13 to which fan blades 15 are attached. Each blade comprises a blade root 17 engaged in a corresponding groove 18 of said rim 13. The latter on its periphery therefore comprises radial projections 20, extending over a certain length, parallel to the axis of the rotor, provided with lateral bosses 22 extending above the edges of the adjacent grooves. The shape of the grooves 18 and the projections 20 is determined in order to hold the blade roots 17. A longitudinal wedge 24 is inserted between the base of the groove and the blade root to stabilize the position of the blade, radially. The upstream ends of the grooves are closed, on the one hand totally by an annular flange 26 called "rear cap shroud head" and on the other hand individually by respective bolts 28. The annular flange 26 is mounted on the rim 13 by screws 30. It also enables the wedges 24 to be immobilized in the grooves.

Each bolt 28 is engaged in notches 34 machined on both sides of the groove 18, which it closes, in the vicinity of the upstream end of the latter. More precisely, each notch 34 is machined in an adjacent radial projection 20, at a distance a from the upstream end of the latter. The bolt therefore prevents displacement of the blade in the axial upstream direction.

Figure 4:
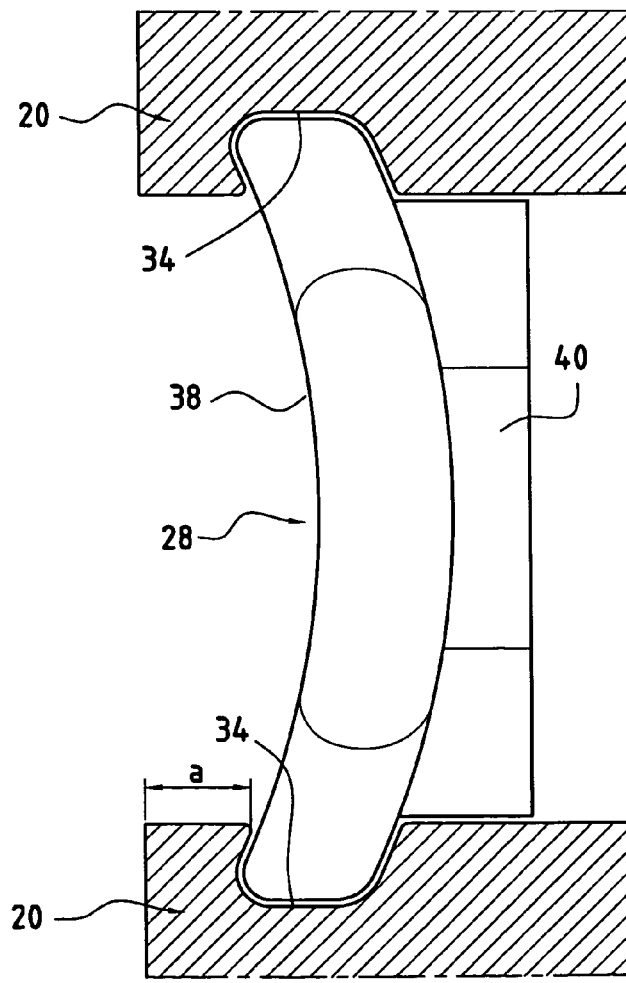
FIG. 4 is a plan view of this bolt, positioned between two radial projections of the rim, illustrated as a cut out section.

According to an important feature of the invention, the bolt 28 comprises a concave plate 38 with its curve directed upstream while the notches 34 are inclined upstream and shaped to accommodate edges of said curved plate (see FIG. 4).

As is easy to see on the drawings, each edge of the curved plate 38 engaged in a notch, has a round shape, each notch 34 having a form complementary to that of the marginal part of the plate 38, which engages therein.

This bolt configuration enables the system to be made lighter in weight by reducing the thickness of the bolts as well as the distance a defined above, all other things being equal.

Moreover, the round shape of the edges of the bolt (FIG. 4) and the corresponding round shape of the notches, allow the contact surfaces to be increased and consequently the concentrations of stress in the notches 34 to be eliminated.

Thanks to the invention, dispersion of a significant part of the axial forces into tangential forces is achieved in the event of loss of blade.

Moreover, the edges 35 of the plate which engage in the notches 34 are inclined towards one another in the external radial direction. The notches 34 are formed with the same inclination as the edges of the plates, that is to say two notches corresponding to the same bolt are inclined towards one another, radially from the interior towards the exterior. Thus, the bolt 28 is put in place by inserting it through the interior ends of the notches, which open out. The external edges do not open out. No fool-proofing system for the bolt is necessary.

Moreover, each bolt 28 comprises an extension 28a extending radially towards the interior, provided with an opening 39 for passage of a wedge 24 mentioned above. The wedge is engaged at the base of the groove, under the blade root and also in the thickness of the bolt.

Consequently, during production, the insertion of the wedge 24 stabilizes the positioning of the corresponding bolt 28. The subsequent mounting of the annular flange 26 stabilizes the assembly of the wedges.

Moreover, each bolt comprises a downstream damping reinforcement 40, all in one block with said curved plate 38. This reinforcement protrudes into the corresponding groove 18, facing the end of the blade root.

The invention claimed is:

1. A turbojet fan rotor, comprising:
   a plurality of fan blades, attached to a rim, each blade comprising a blade root engaged in a groove of said rim and held in said rim by a bolt engaged in notches machined on both sides of the groove, in the vicinity of the upstream end of the groove, so as to prevent displacement of said blade root in the axial direction,
   wherein said bolt comprises a concave plate that includes a curve directed upstream, and
   wherein said notches are inclined upstream and shaped to accommodate the edges of said curved plate.

2. The rotor as claimed in claim 1, wherein each curved plate edge has a round shape and wherein the notches have a corresponding round shape.

3. The rotor as claimed in claim 1, wherein the bolt further comprises a downstream damping reinforcement, all in one block with said plate and protruding into the corresponding groove.

4. The rotor as claimed in claim 1, wherein the bolt further comprises an extension extending radially towards the interior, provided with an opening for passage of a wedge, said wedge being engaged at the bottom of said groove under the blade root.

5. An aircraft turbojet fan wherein said aircraft turbojet fan comprises a rotor including:
   a plurality of fan blades, attached to a rim, each blade comprising a blade root engaged in a groove of said rim and held in said rim by a bolt engaged in notches machined on both sides of the corresponding groove, in the vicinity of the upstream end of the latter, so as to prevent displacement of said blade root in the axial direction,
   wherein said bolt comprises a concave plate with its curve directed upstream, and
   wherein said notches are inclined upstream and shaped to accommodate the edges of said curved plate.

6. The aircraft turbojet fan as claimed in claim 5, wherein each curved plate edge has a round shape and wherein the notches have a corresponding round shape.

7. The aircraft turbojet fan as claimed in claim 5, wherein the bolt further comprises a downstream damping reinforcement, all in one block with said plate and protruding into the corresponding groove.

8. The aircraft turbojet fan as claimed in claim 5, wherein the bolt further comprises an extension extending radially towards the interior, provided with an opening for passage of a wedge, said wedge being engaged at the bottom of said groove under the blade root.

9. An aircraft turbojet wherein said aircraft turbojet comprises a fan having a rotor including:
   a plurality of fan blades, attached to a rim, each blade comprising a blade root engaged in a groove of said rim and held in said rim by a bolt engaged in notches machined on both sides of the corresponding groove, in the vicinity of the upstream end of the latter, so as to prevent displacement of said blade root in the axial direction,
   wherein said bolt comprises a concave plate with its curve directed upstream, and
   wherein said notches are inclined upstream and shaped to accommodate the edges of said curved plate.

10. The aircraft turbojet as claimed in claim 9, wherein each curved plate edge has a round shape and wherein the notches have a corresponding round shape.

11. The aircraft turbojet as claimed in claim 9, wherein the bolt further comprises a downstream damping reinforcement, all in one block with said plate and protruding into the corresponding groove.

12. The aircraft turbojet as claimed in claim 9, wherein the bolt further comprises an extension extending radially towards the interior, provided with an opening for passage of a wedge, said wedge being engaged at the bottom of said groove under the blade root.

* * * * *